(No Model.)
A. B. SUMMERS.
VENTILATOR.
No. 261,404. Patented July 18, 1882.
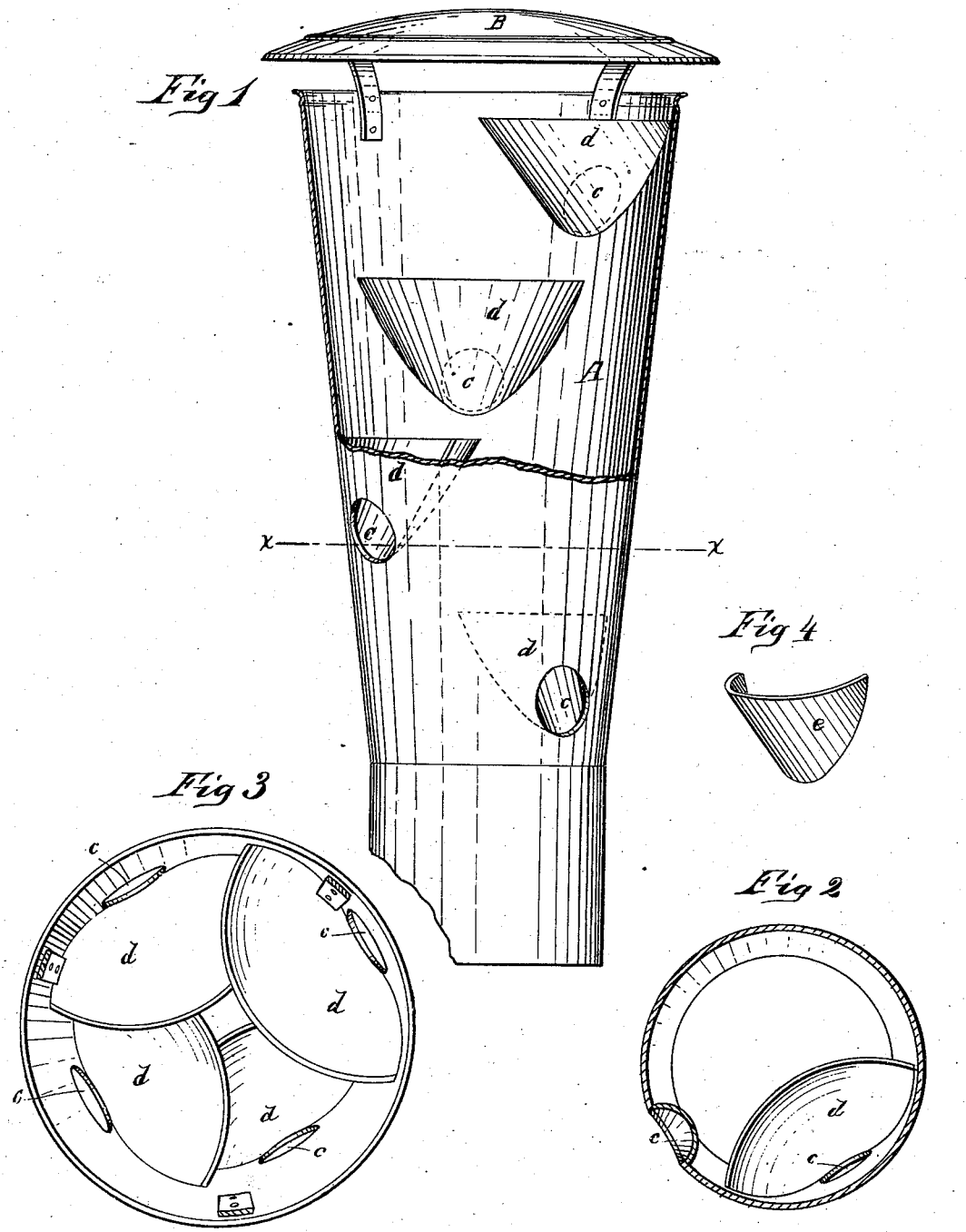
WITNESSES:
INVENTOR:
A. B. Summers
BY Munn & Co
ATTORNEYS.

UNITED STATES PATENT OFFICE.

ALEXANDER B. SUMMERS, OF BROOKLYN, N. Y., ASSIGNOR OF ONE-HALF TO HENRY KRONE AND WILLIAM MEYER, BOTH OF SAME PLACE.

VENTILATOR.

SPECIFICATION forming part of Letters Patent No. 261,404, dated July 18, 1882.

Application filed March 2, 1882. (No model.)

*To all whom it may concern:*

Be it known that I, ALEXANDER B. SUMMERS, of Brooklyn, county of Kings, State of New York, have invented a new and useful Improvement in Ventilators, of which the following is a full, clear, and exact description.

My invention relates to improvements in ventilator-shafts; and it consists in the peculiar construction and arrangement of parts, as hereinafter fully set forth.

Reference is to be had to the accompanying drawings, forming part of this specification, in which similar letters of reference indicate corresponding parts in all the figures.

Figure 1 is a side elevation, partly in section, of my invention. Fig. 2 is a cross-section at $x\ x$. Fig. 3 is a plan view with the cap B removed. Fig. 4 is a perspective view of one of the plates used in forming the uptakes $d$.

A is the shaft of a ventilator. B is a cap over the same. $c\ c\ c\ c$ are openings in the exterior walls of the ventilating-shaft, arranged spirally one above the other, and in connection with the uptakes $d\ d\ d\ d$ are uptakes of half-funnel form (arranged spirally, as above) secured to the interior walls of the ventilating-shaft in such manner that, in connection with the openings $c\ c\ c\ c$, any current of air entering said openings will be directed and diffused upward, and a suction will thereby be produced within the shaft of the ventilator. As there are openings $c$ on all sides of the ventilator, no matter from what direction the wind comes it will enter one or more of the openings and be diffused upward by the uptakes, as described. The spiral arrangement of uptakes one above the other, as shown, permits the placing of the uptakes on all sides of the ventilating-shaft without blocking up or much impeding a free upward draft of air through the ventilator.

At $e$, Fig. 4, is shown one of the plates of flaring or half-funnel form used in connection with the exterior walls of the ventilating-shaft for the purpose of forming the uptakes $d\ d\ d\ d$. These plates $e$, of suitable material, in the shape before described, are secured against the inner walls of the ventilating-shaft, as shown, and when the plates are thus secured and the openings $c$ made the uptake is complete, the wall of the ventilator forming one side of the plate and the plates $e$ the other side.

I am aware that a ventilator-shaft provided with holes in its sides, having deflecting-plates placed over said holes, has heretofore been employed, and I therefore lay no claim to such construction, my invention being confined to the precise construction and arrangement of parts as pointed out in the claim.

I do not claim broadly the idea of combining uptakes that communicate with the external air with ventilating-shafts; but,

Having thus fully described my improvements, I claim as new and desire to secure by Letters Patent—

The combination, with the conical ventilator-shaft A, provided with the cap B and openings $c$, arranged spirally therein, of the half-funnel-shaped plates $e$, secured to the inner wall of the shaft around said openings, substantially as and for the purpose set forth.

ALEXANDER B. SUMMERS.

Witnesses:
W. S. WALKER,
C. SEDGWICK.